United States Patent
Gotman et al.

(10) Patent No.: US 8,831,541 B2
(45) Date of Patent: Sep. 9, 2014

(54) MULTIPLE ANTENNA WIRELESS TELECOMMUNICATION METHOD AND SYSTEM

(75) Inventors: Max Gotman, Ramat Gan (IL); Assaf Touboul, Natanya (IL); Oz Barak, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 418 days.

(21) Appl. No.: 12/637,775

(22) Filed: Dec. 15, 2009

(65) Prior Publication Data

US 2010/0157970 A1 Jun. 24, 2010

Related U.S. Application Data

(60) Provisional application No. 61/138,535, filed on Dec. 18, 2008.

(51) Int. Cl.
| | | |
|---|---|---|
| *H03C 7/02* | (2006.01) | |
| *H04B 7/02* | (2006.01) | |
| *H04B 1/04* | (2006.01) | |
| *H04L 5/00* | (2006.01) | |
| *H04B 7/06* | (2006.01) | |

(52) U.S. Cl.
CPC ............ *H04B 7/0697* (2013.01); *H04L 5/0023* (2013.01); *H04L 5/0044* (2013.01)
USPC ............ 455/101; 455/103; 455/522; 375/267

(58) Field of Classification Search
USPC ............................. 455/522, 101, 103; 375/267
See application file for complete search history.

(56) References Cited

U.S. PATENT DOCUMENTS

| | | | |
|---|---|---|---|
| 6,785,341 B2 | 8/2004 | Walton et al. | |
| 7,630,356 B2 * | 12/2009 | Zhang et al. | 370/344 |
| 8,223,622 B2 * | 7/2012 | Chin et al. | 370/203 |
| 2004/0131125 A1 | 7/2004 | Sanderford et al. | |
| 2007/0098101 A1 | 5/2007 | Kondylis | |
| 2007/0263735 A1 | 11/2007 | Tong et al. | |
| 2007/0291680 A1 | 12/2007 | Machida | |
| 2009/0092090 A1 * | 4/2009 | Beems Hart et al. | 370/329 |
| 2010/0086069 A1 * | 4/2010 | Usui | 375/260 |
| 2011/0255434 A1 * | 10/2011 | Ylitalo | 370/252 |

OTHER PUBLICATIONS

PCT/ISA/US, International Search Report and Written Opinion dated Apr. 23, 2010, Int'l App. No. PCT/IL2009/001195, 8 pgs.

* cited by examiner

*Primary Examiner* — Wesley Kim

(57) ABSTRACT

A wireless telecommunication system and method including at least two transmit antennae and means for implementing a downlink switched sub-channels diversity scheme during transmission. The method includes splitting a total bandwidth allocated for transmission of a transmitted signal to individual sub-channels or groups of sub-channels; boosting each of the sub-channels or groups of sub-channels; and routing each of the sub-channels or groups of sub-channels to a different transmit antenna.

21 Claims, 6 Drawing Sheets

6 transmit antennae example

3 / 6 transmit antennae example 6 transmit antennae example

MULTIPLE ANTENNA WIRELESS TELECOMMUNICATION METHOD AND SYSTEM

RELATED APPLICATIONS

This application claims the benefit of U.S. provisional application Ser. No. 61/138,535 filed 18 Dec. 2008.

FIELD OF THE INVENTION

The present invention relates to wireless telecommunications systems, in general and, in particular, to a method and system for transmitting over a wireless OFDM (Orthogonal Frequency Division Multiplexing), or SC-FDMA (Single-Carrier Frequency Division Multiple Access) telecommunications system using multiple transmit antennas.

BACKGROUND OF THE INVENTION

In WiMAX systems, several multiple antennae transmit techniques have been adopted to deliver extended capacity and/or coverage in the DL (Down Link), with little or no cost to the mobile station. These MIMO (multiple input multiple output) techniques usually include STC (Space-Time Coding) Matrix A (aka the Alamouti scheme), which is commonly used as a means to provide diversity, and adaptive beam forming algorithms intended to focus transmitted energy on individual subscribers using relatively narrow beams.

Although provisions were made in the 802.16e mobile WiMAX standard to enable the aforementioned approaches when transmitting the individual DL traffic, the possibilities are much more limited for achieving a comparable performance boost when transmitting broadcast DL and UL (Up Link) maps messages. While the adaptive 'narrow' beam forming techniques, per definition, cannot provide simultaneous coverage across the entire sector when a broadcast message is transmitted, applying STC Matrix A to these maps messages is precluded by the WiMAX standard and profiles. Thus, even when the individual data connection's range can be extended using the MIMO techniques, the cell coverage won't be extended at all due to the limited coverage during transmission of the maps zone.

One common approach to overcome this bottleneck is using a stronger FEC (Forward Error Correction) (with repetition coding), at the immediate expense of capacity, due to greater overhead of map messages. Another approach is applying the CDD (Cyclic Delay Diversity) technique, used in many technologies, to provide additional diversity, by transmitting from the second antenna a cyclically delayed replica of the signal. CDD is widely recognized to perform well in rich fading environments, but raises many issues in line-of-sight (LOS) or near line-of-sight situations, since it can create interference. Performance degradation due the interference can be reduced by advertising the CDD to the receiver, i.e., signaling to the subscriber explicitly with a dedicated message describing how the CDD scheme is applied in the DL transmitter, with an additional overhead of this signaling, but at the expense of the useful bandwidth. One additional aspect of using either CDD or STC Matrix A techniques is that, while both are well defined for the two transmit antennae case, it could be very challenging to extend their usage beyond this number of transmit antennae available in the base station.

In LTE, the DL control channel is transmitted using the SFBC (Space-Frequency Block Coding) transmit diversity (T×D) scheme using all the available transmit antennas (2 or 4). In practice, when four transmit antennas are available, the T×D precoding scheme dictates using only two of them at each given time instance thus precluding exploiting the full power available in the transmitter.

Accordingly, there is a long felt need for a method and system for extending wireless coverage and/or capacity to all portions of the transmitted traffic, and it would be very desirable to provide this extension by permitting usage of multiple transmit antennae without the conventional bottleneck.

SUMMARY OF THE INVENTION

The present invention relates to wireless telecommunication system and method including at least two transmit antennae and means for implementing a downlink switched sub-channels diversity scheme during transmission. The method includes splitting a burst into at least two sub-bursts, each sub-burst being transmitted via a different antenna or pair of antennae.

There is provided according to the present invention a method for transmission over a wireless telecommunication system utilizing OFDM or SC-FDMA (Single-Carrier Frequency Division Multiple Access), and MIMO (Multiple In Multiple Out) antenna techniques, the method including splitting an entire spectrum of a transmitted signal to individual sub-channels or groups of sub-channels, boosting each of the sub-channels or groups of sub-channels, preferably inversely to the relative bandwidth they occupy with the total available bandwidth, and routing each of the sub-channels or groups of sub-channels to a different transmit antenna.

There is further provided, according to the invention, a wireless communication system utilizing OFDM or SC-FDMA, and MIMO, the system including a transmitter including at least two transmit antennae and a MAC frame manager and wireless driver in the transmitter for implementing a downlink switched sub-channels diversity (DSSD) scheme during transmission, wherein the frame manager splits a burst into at least two sub-bursts, and generic beam-forming hardware in said transmitter for driving each sub-burst for transmission to a different one of said transmit antennae.

BRIEF DESCRIPTION OF THE DRAWINGS

The present invention will be further understood and appreciated from the following detailed description taken in conjunction with the drawings in which.

DETAILED DESCRIPTION OF THE INVENTION

The present invention relates to a method and system for wireless telecommunication providing expanded capacity and/or coverage for DL and UL maps messages and other portions of transmitted traffic, when using multiple antennae. This is accomplished by providing Downlink Switched Sub-channels Diversity—DSSD during transmission.

The DSSD is a novel scheme where the entire spectrum of the transmitted signal is split to individual sub-channels or groups of sub-channels, each of which is then appropriately boosted, preferably by a factor which is an inverse of the ratio of the group's aggregate bandwidth (BW) to the whole available BW. According to some embodiments, given a complex modulated subcarrier s, to undergo power boosting of factor P, the corresponding boosted subcarrier S is obtained by multiplying s with the gain G=sqrt(P), i.e. S=Gs. For example, in the simplest case of the 2-fold, described below with reference to FIG. 2, the $1^{st}$ group contains 16 sub-channels while the $2^{nd}$ group includes 14 sub-channels out of the total 30, they will undergo a power boost of 30/16 and 30/14 respectively, or, for simplicity, each can be power-boosted by 2, which is equivalent to 3 dB. Each boosted signal is driven to a different transmit antenna. If desired, each group can be routed to more than one antenna, if it is possible to combine the DSSD scheme with CDD or STC, where applicable, for additional diversity. This scheme can be used mostly for, but is not limited to, non-line of sight deployments.

For the $1^{st}$ DL PUSC (Partial Usage of Sub-channels) zone (used for signaling MAP messages) and for any other DL PUSC zone, the DSSD can be applied as follows:

The $1^{st}$ DL PUSC Zone

The $1^{st}$ DL PUSC zone is comprised of the FCH (Frame Control Header) burst, immediately followed by the DL-MAP and UL-MAP bursts. When all the sub-channels are being used, these bursts are usually spread across the entire spectrum, i.e., across all the so-called major groups of the PUSC sub-channels. If these bursts could be split to sub-bursts at the boundaries of the major groups, each sub-burst could be transmitted using a different antenna (or pair of antennas, when the CDD is applicable), thus gaining the combined power and increased diversity for the entire zone.

In the case of WiMAX, such a split can be achieved, for example, using the SUB-DL-UL-MAP bursts option included in the IEEE 802.16e-2005, mobile WiMAX standard where, instead of a single map burst, chained multiple sub-bursts are transmitted. For the commonly used FFT (Fast Fourier Transform)-1024 (7/10 MHz) channel, although not limited to this channel, a few examples of the spectrum breakdown to multiple antennas could be as follows, as shown in FIGS. 1-3.

Figure 1:
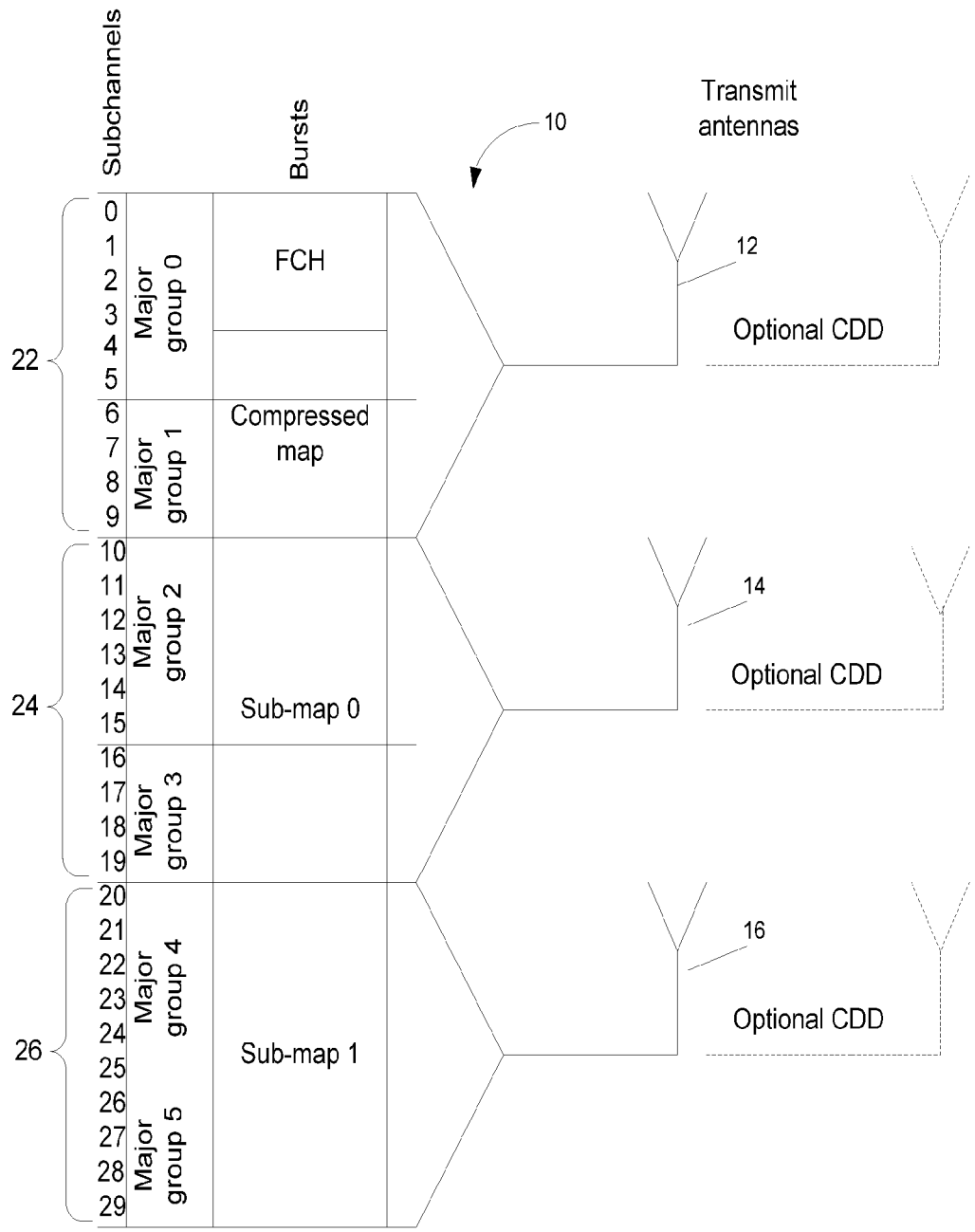
FIG. 1 is a schematic illustration of a downlink switched sub-channels diversity scheme, constructed and operative in accordance with one embodiment of the present invention, in a 3/6 transmit antennas example.

FIG. 1 shows an exemplary DSSD scheme 10 for map messages (messages that define the frame's structure (division into zones, bursts), when using 3/6 transmit antennae 12, 14, 16 (i.e., three antennas or three antenna pairs). As can be seen, the spectrum of the transmitted signal, which includes 30 sub-channels or data slots, as known, can be further split to 3 groups of channels or sub-bursts 22, 24, 26. Each sub-burst can be boosted by a factor of 3, since each occupies ⅓ of the total BW, and routed for transmission over a different transmit antenna, or antenna pair, if CDD, or the like, is utilized.

Figure 2:
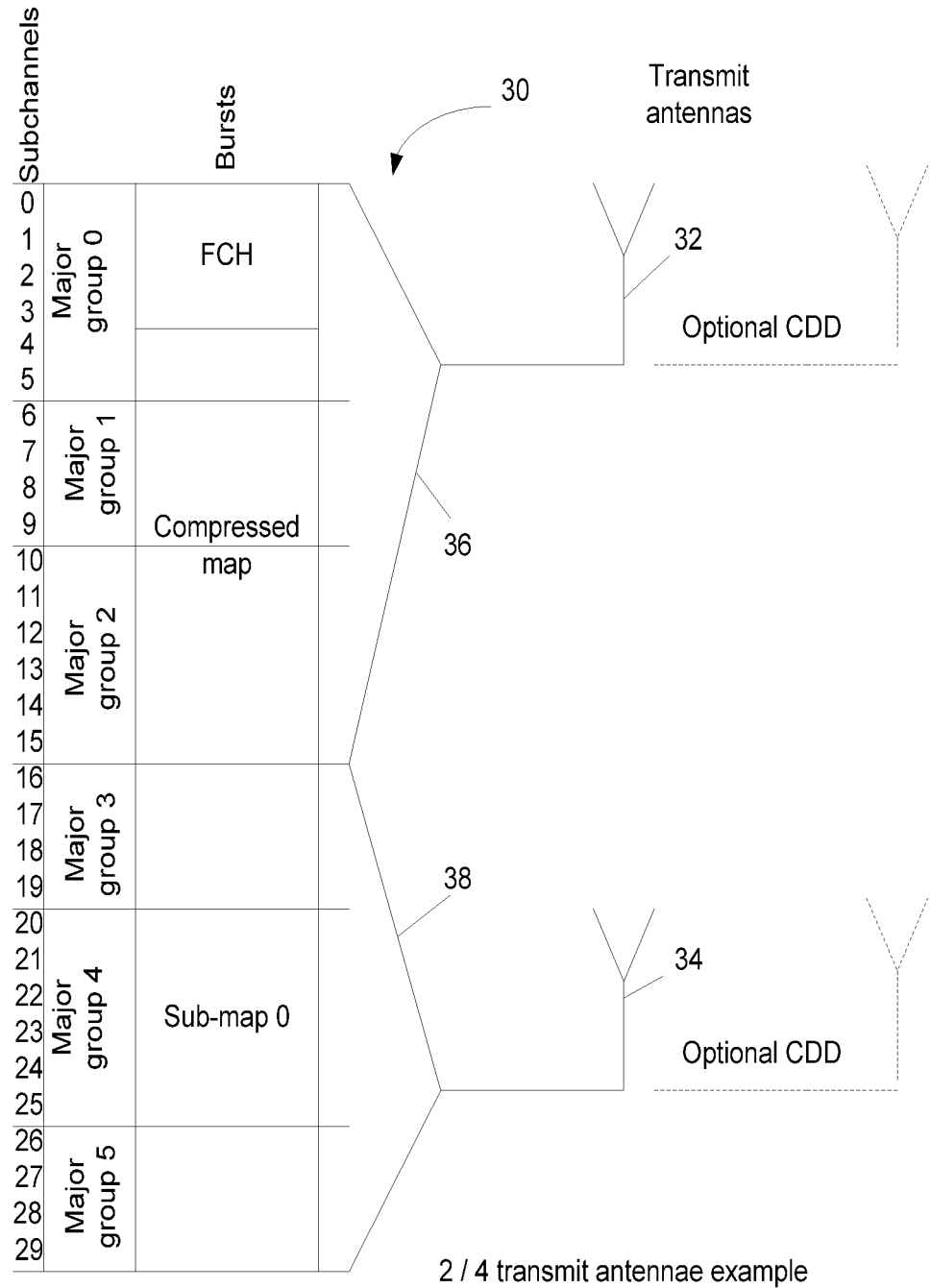
FIG. 2 is a schematic illustration of a downlink switched sub-channels diversity scheme, constructed and operative in accordance with one embodiment of the present invention, in a 2/4 transmit antennas example.

FIG. 2 shows an exemplary DSSD scheme 30 for map messages, when using 2/4 transmit antennae 32, 34 (two antennas or two pairs of antennas). Here, 30 sub-channels are split to 2 groups of channels or sub-bursts 36, 38, each boosted by a factor of 2, and routed for transmission over a different transmit antenna, or antenna pair, if CDD, or the like, is utilized.

Figure 3:
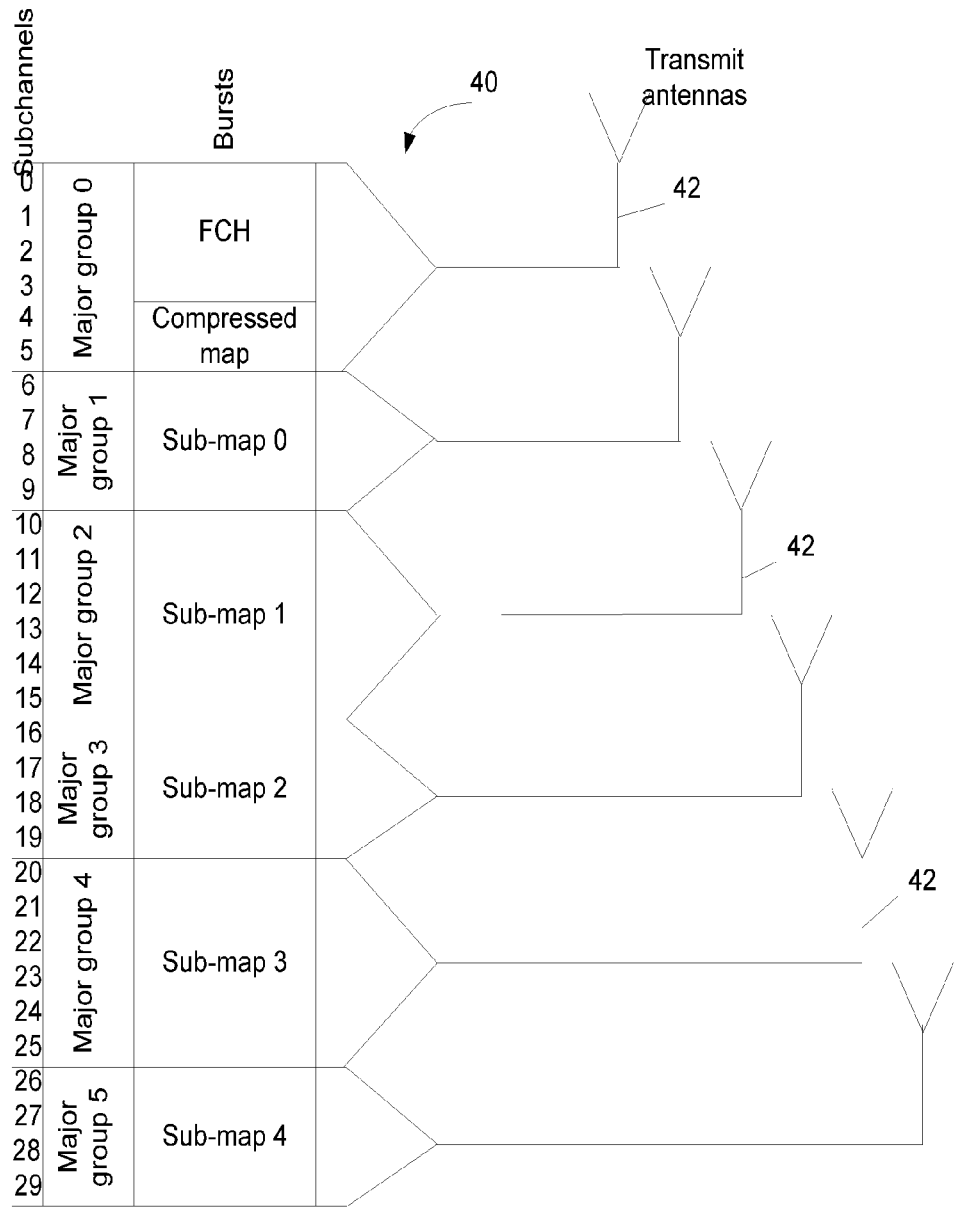
FIG. 3 is a schematic illustration of a downlink switched sub-channels diversity scheme, constructed and operative in accordance with one embodiment of the present invention, in a 6 transmit antennas example.

FIG. 3 shows an exemplary DSSD scheme 40 for map messages, when using 6 transmit antennae 42. Here, 30 sub-channels are split into 6 sub-bursts, according to major groups. In this embodiment, the sub-bursts are boosted as follows. The sub-bursts in the groups 0, 2, 4 are boosted by 30/6=5 or 7 dB, while the bursts in the groups 1, 3, 5 are boosted by 30/4=7.5 or 8.75 dB; thus gaining overall average power boost of 10 lg6=7.8 dB. The boosted signals from each group are then driven for transmission over a different transmit antenna. If 12 antennae are used (not shown), each group can be transmitted over a different antenna pair, if CDD, or the like, is utilized. In fact, there is a certain penalty due to degradation in the performance of a Convolutional Turbo Code (CTC) decoder when using smaller bursts (i.e., smaller Forward Error Correction blocks). For example, using 36-byte blocks (6-slots bursts)/24-byte blocks (4-slots bursts) will cause ~0.2 dB or ~0.6 dB degradation respectively, with respect to the full size 60-byte (10 concatenated slots) FEC blocks of QPSK CTC R=½. Even this leaves the DSSD to be highly beneficial, gaining approximately 10 lg N dB, N being the number of transmitting antennas.

Figure 4:
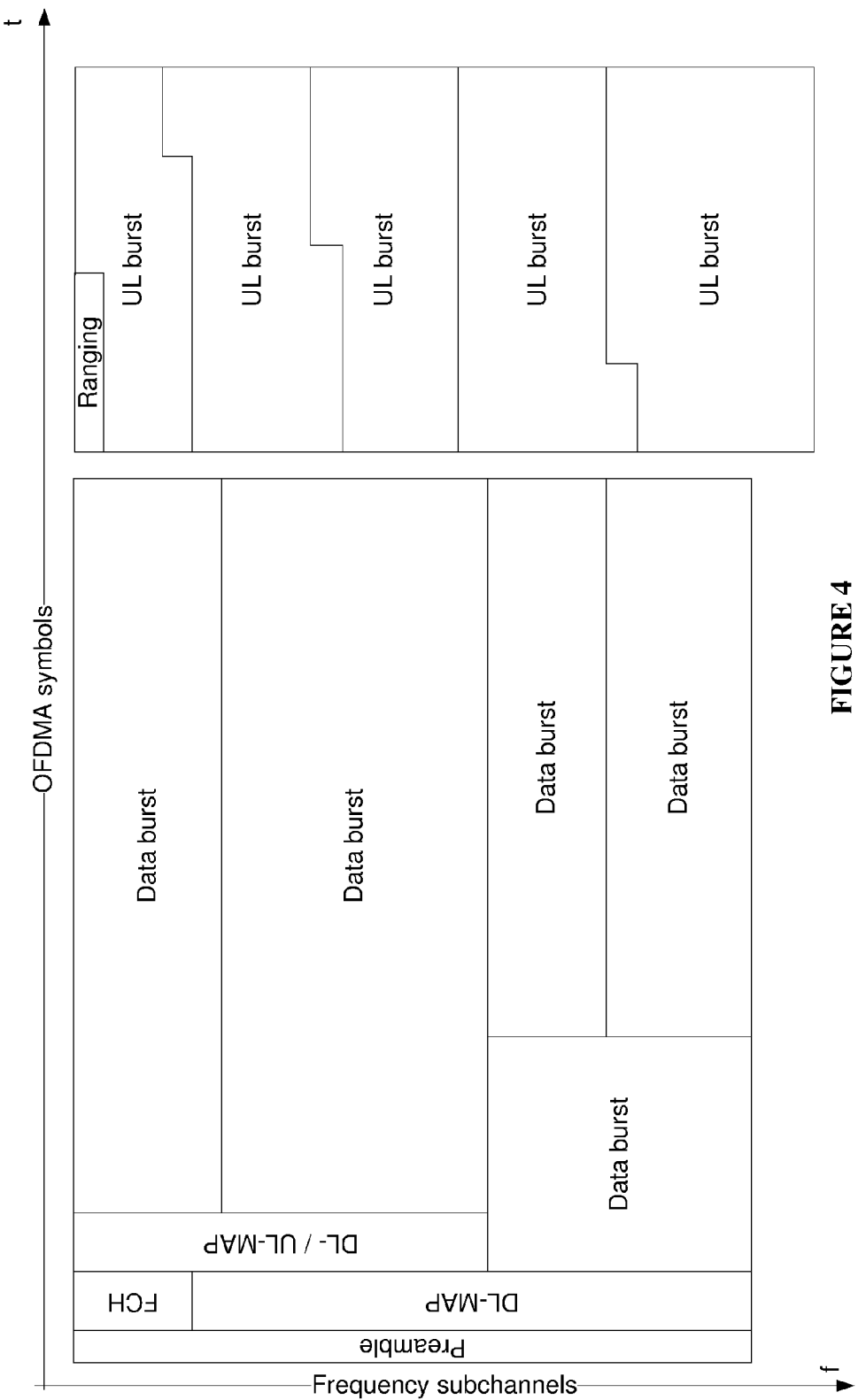
FIG. 4 is a prior art transmission frame.

It will be appreciated that the first division shown in FIGS. 1-3 would replace the corresponding slots (occupying the symbols 2 to 5 on FIG. 4) in the conventional WiMAX frame shown in FIG. 4, or in the frame of another telecommunications network using OFDM and MIMO, such as LTE or WiFi.

In LTE DL or UL transmission, on the other hand, the entire spectrum in use is divided to so called resource blocks (RBs), each containing 12 subcarriers called resource elements (REs). In the time domain, sub-frames of 14 symbols are defined. DSSD can easily be applied by mapping half the allocated RBs (for example, the even RBs, although any other half would work) to the $1^{st}$ TX antenna, and the remaining RBs to the $2^{nd}$ TX antenna, during each of the sub-frame symbols. Each RE will receive a power boost of 3 dB in this case. The scheme can further be extended to a general case of N TX antennas, where N≤NRBs, NRBs being the total number of allocated DL RBs. In this case, the RBs will be split into N (even or almost even) groups of RBs, where each group will be transmitted using a different TX antenna, with a boost of 10 lg(N) applied to each subcarrier.

Any DL PUSC Zone

As mentioned above, the DSSD can be applied to any down link PUSC data zone to achieve extended diversity. In these zones, splitting the bursts to sub-bursts can be 'virtual', since there is no constraint of the 4-slots mandatory FCH burst existing in the beginning of these zones. Thus, for example, a burst of 30 sub-channels (slots) using a concatenation rule of 10 slots per FEC block, can be split into 3 virtual sub-bursts of 10 slots each (QPSK CTC R=½), each transmitted from a different antenna or pair of antennae. In this case, only the Base Station transmitter is aware of the split, as the receiver still receives the whole burst. This virtual sub-burst splitting can be easily generalized or extended to higher WiMAX Multiple Coding Schemes and other concatenation rules (such as 2, 3, 5, or 6 slots per CTC FEC block).

AMC (Adaptive Modulation and Coding) Zone

The DSSD can be equally applied to the AMC zone, if it is desired to introduce a diversity element to this usually non-frequency-diversified zone type. In this case, the DSSD granulation will have a resolution of a sub-channel when defining virtual sub-bursts.

WiMAX Preamble

According to one embodiment of the invention, the WiMAX preamble can undergo a similar DSSD procedure as the $1^{st}$ PUSC zone, described above. This can be performed if it appears that it will improve performance in the receiver. In this case, support will be required in the beam former hardware, so that the beam former can drive each sub-carrier of each of the N groups to the transmit antenna assigned for transmitting that group.

DSSD Implementation Requirements

The hardware should be able to support flexible beam forming to route different chunks of the transmitted spectrum to different antennas, with a resolution of at least one sub-channel. The MAC (Media Access Control) frame manager software, together with a wireless driver, which is responsible for configuring the PHY and MAC hardware on a frame-by-frame basis, according to the frame structure built by the frame manager, should be able to build optimized map sub-bursts in the $1^{st}$ PUSC zone, or virtual sub-bursts in any other zone where the DSSD scheme is applicable.

According to one embodiment of the invention, the Frame Manager package includes the following functionalities, many of which are conventional functionalities of the frame manager. For each frame:

Set Frame Control Header (FCH)

Plan Map Message (DL+UL IEs+HARQ ACK+ATPC Control) (i.e., DownLink and UpLink Information Elements+Hybrid Automatic Retransmission Request Acknowledgment and Automatic Transmit Power Control)

According to the present invention, if DSSD is used in the $1^{st}$ zone, the MAC frame manager now splits the map to sub-maps for purposes of DSSD Plan DL Zones According to the present invention, for each zone where DSSD is applicable: split the data bursts to virtual sub-bursts for DSSD, as described above.

Plan UL Zones

Plan Backhauling Zones

According to Scheduler allocations and Connections Rate:

Build Broadcast Burst

Set DL MAC Payload Data Units into Bursts and sub-bursts where needed for DSSD

Build HARQ MPDU Bursts

Plan HARQ Channels usage

UL subframe planning and building

UL

Set Polling Allocations

Set data/Management UL allocation

The suggested DSSD scheme is advantageous over other MIMO diversity techniques in several aspects:

Unlike STC Matrix A, DSSD is applicable to the $1^{st}$ PUSC (MAP) zone.

Unlike CDD or STC Matrix A, DSSD is easily adapted to more than two transmit antennas.

DSSD performs better than CDD in LOS or near-LOS locations and does not create interference since each subcarrier goes out of a single antenna.

Unlike CDD which applies different delays to different antennas, DSSD does not complicate synchronization issues.

Furthermore, unlike conventional CDD schemes, DSSD is transparent to the DL receiver.

Moreover, DSSD can be easily combined with CDD or STC Matrix A to achieve additional diversity, where applicable.

Figure 5:
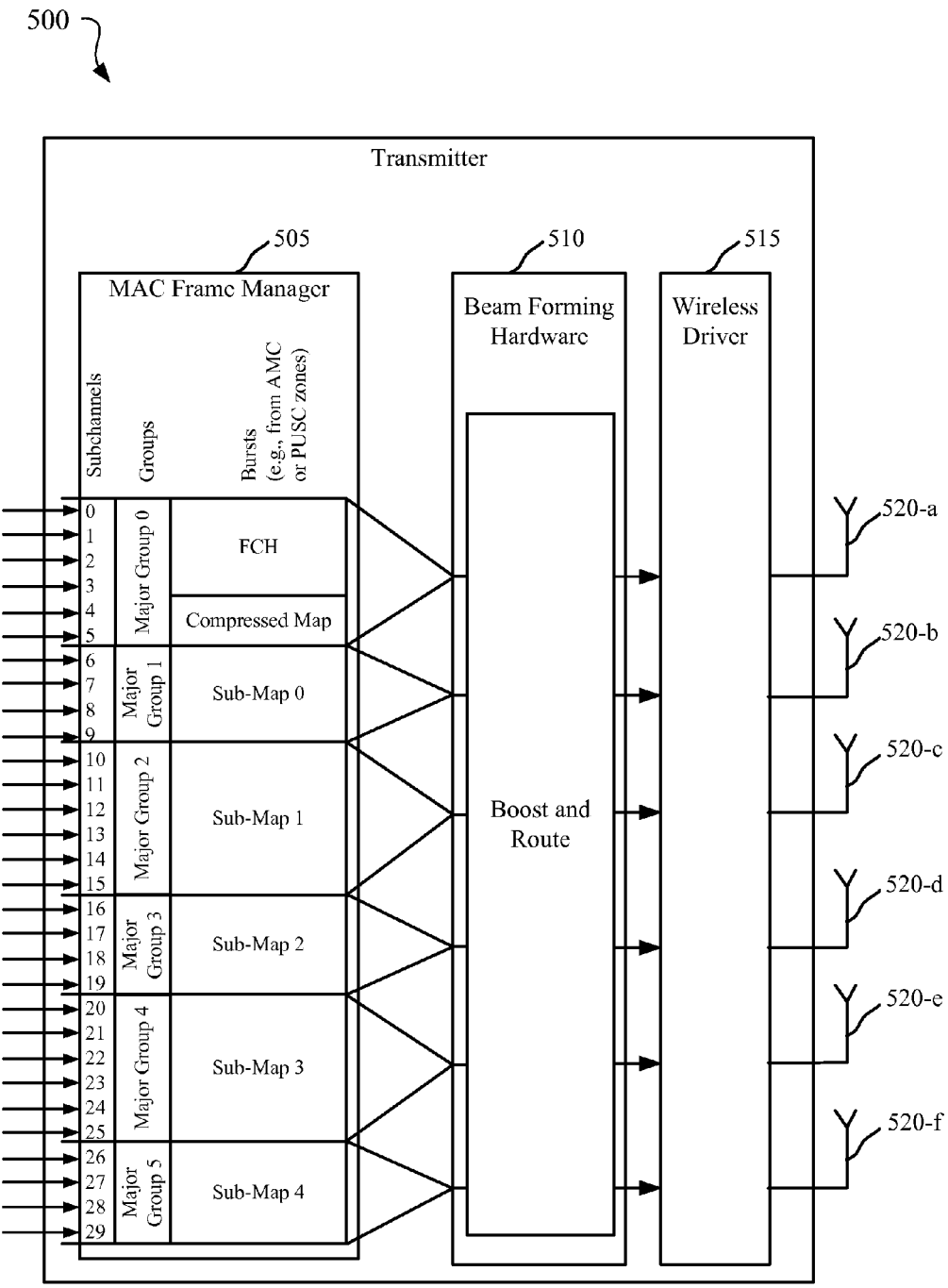
FIG. 5 is a schematic illustration of a transmitter configured to provide Downlink Switched Sub-channels Diversity (DSSD) during transmission of data.

It will be appreciated that DSSD does not requires any special receiver MSS (Mobile Subscriber Station) implementation—any standard off the shelf MSS can take advantage of this scheme without any modification FIG. 5 is a schematic illustration of a transmitter 500 configured to provide DSSD during transmission of data, consistent with the principles of this disclosure. The transmitter 500 may include a MAC frame manager 505, beam forming hardware 510, a wireless driver 515, and a number of antennae 520.

As shown in FIG. 5, the MAC frame manager may be configured to receive a number of sub-channels that collectively make up a total transmission bandwidth allocated for the transmission of a transmitted signal. The MAC frame manager 505 may split the total transmitted bandwidth into multiple groups of sub-channels. The sub-channels may split a burst of data associated with the transmitted signal into a plurality of sub-bursts. Thus, in the present example, a burst carrying map messages may be split into a number of mapping sub-bursts (i.e., Sub-Map 0, Sub-Map 1, etc.). As described previously, the burst of data may include one or more of the following components: a transmission from a downlink Partial Usage of Sub-Channels (PUSC) zone, a WiMAX preamble, a transmission from an Adaptive Modulation and Coding (AMC) zone, etc.

The beam-forming hardware 510 of the transmitter 500 may include a boost and route module 525 configured to boost each of the groups of sub-channels and route each group of sub-channels to a different set of one or more transmit antennae 520. Thus, each sub-burst may be transmitted over a different set of transmit antennae 520. The wireless driver 515 may be configured to drive each group of sub-channels on the set of transmit antennae 520 to which that group was routed.

Figure 6:
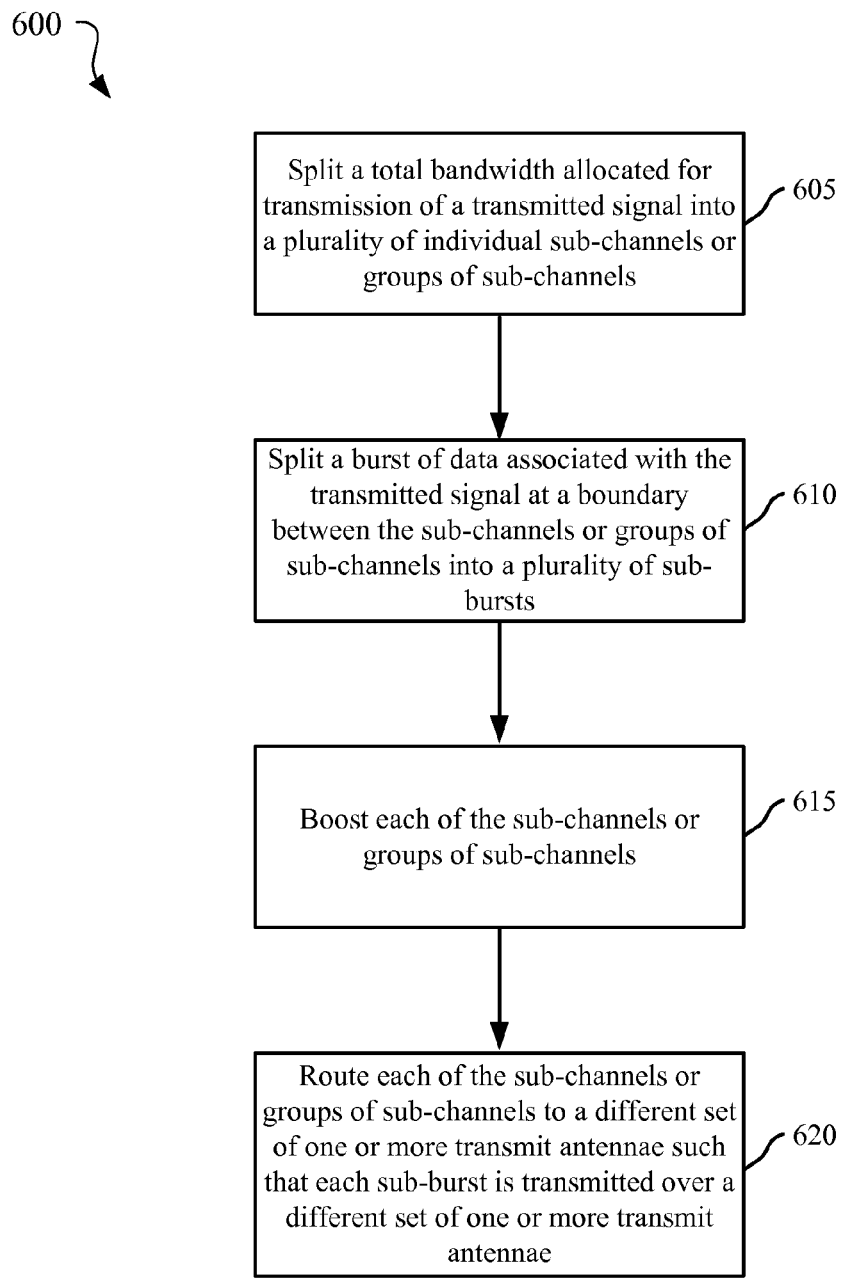
FIG. 6 is a flowchart diagram of an example of a method of transmitting wireless data.

FIG. 6 is a flowchart diagram of an example of a method 600 of transmitting wireless data. At block 605, a total bandwidth allocated for transmission of a transmitted signal may be split into a plurality of individual sub-channels or groups of sub-channels. At block 610, a burst of data associated with the transmitted signal may be split into a plurality of sub-bursts at a boundary between the sub-channels or groups of sub-channels. At block 615, each of the sub-channels or groups of sub-channels may be boosted, for example by a factor which is an inverse of the ratio of each group's aggregate bandwidth to a total available bandwidth. At block 620, each of the sub-channels or groups of sub-channels may be routed to a different set of one or more transmit antennae such that each sub-burst is transmitted over a different set of one or more transmit antennae.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. A method for transmission over a wireless telecommunication system utilizing OFDM (Orthogonal Frequency Division Multiplexing) or SC-FDMA (Single-Carrier Frequency Division Multiple Access), and MIMO (Multiple In Multiple Out) antenna techniques, the method comprising:

splitting a total bandwidth allocated for transmission of a signal into a plurality of groups of sub-channels;

splitting a map message associated with the signal into a plurality of map message fragments, each of the plurality of map message fragments associated with one of the groups of sub-channels from the plurality of groups of sub-channels;

splitting the plurality of groups of sub-channels into a plurality of sub-bursts, wherein each sub-burst includes one of the map message fragments;

boosting each of sub-burst of the plurality of sub-bursts; and routing each boosted sub-burst to a different transmit antenna.

2. The method according to claim 1, wherein said boosting includes boosting each sub-burst of the plurality of sub-bursts by a factor which is an inverse of a ratio of an aggregate group bandwidth (BW) to the total available BW.

3. The method according to claim 2, wherein said step of routing includes providing STC (Space-Time Coding) Matrix A and routing each of said sub-channels or groups of sub-channels to a different pair of transmit antennas.

4. The method according to claim 3, further comprising SFBC (Space-Frequency Block Coding) for LTE.

5. The method according to claim 1, wherein said routing includes providing Cyclic Delay Diversity and routing each sub-burst of the plurality of sub-bursts to a different transmit antenna.

6. The method according to claim 1, wherein said sub-channels are LTE resource blocks (RBs) and said groups of sub-channels are groups of RBs.

7. The wireless telecommunication method according to claim 1, wherein the map message comprises a transmission from a downlink PUSC (Partial Usage of Sub-channels) zone.

8. The wireless telecommunication method according to claim 1, wherein the map message comprises a portion of a WiMAX preamble.

9. The wireless telecommunication method according to claim 1, wherein the map message comprises a portion of an AMC (Adaptive Modulation and Coding) zone transmission.

10. The method according to claim 1, wherein said step of routing includes providing STC (Space-Time Coding) Matrix A and routing each of said sub-channels or groups of sub-channels to a different pair of transmit antennas.

11. The method according to claim 10, further comprising SFBC (Space-Frequency Block Coding) for LTE.

12. A wireless communication system utilizing OFDM (Orthogonal Frequency Division Multiplexing) or SC-FDMA (Single-Carrier Frequency Division Multiple Access), and MIMO (Multiple In Multiple Out) antenna techniques, the system comprising:
a transmitter including at least two transmit antennas;
a MAC frame manager and wireless driver in the transmitter for implementing a downlink switched sub-channels diversity (DSSD) scheme during transmission, wherein the MAC frame manager is configured to:
split a total bandwidth allocated for transmission of a transmitted signal into a plurality of groups of sub-channels;
split a map message associated with the signal into a plurality of map message fragments, each of the plurality of map message fragments associated with one of the groups of sub-channels from the plurality of groups of sub-channels; and
split the plurality of groups of sub-channels into a plurality of sub-bursts, wherein each sub-burst includes one of the map message fragments; and
beam forming hardware in the transmitter configured to:
boost each sub-burst of the plurality of sub-bursts; and
route each boosted sub-burst to a different transmit antenna.

13. The wireless telecommunication system of claim 12, wherein the map message comprises a transmission from a downlink PUSC (Partial Usage of Sub-channels) zone.

14. The wireless telecommunication system of claim 12, wherein the map message comprises a portion of a WiMAX preamble.

15. The wireless telecommunication system of claim 12, wherein the map message comprises a portion of an AMC (Adaptive Modulation and Coding) zone transmission.

16. An apparatus for transmitting over a wireless telecommunication system utilizing OFDM (Orthogonal Frequency Division Multiplexing) or SC-FDMA (Single-Carrier Frequency Division Multiple Access), and MIMO (Multiple In Multiple Out) antenna techniques, the apparatus comprising:
means for splitting a total bandwidth allocated for transmission of a signal into a plurality of groups of sub-channels;
means for splitting a map message associated with the signal into a plurality of map message fragments, each of the plurality of map message fragments associated with one of the groups of sub-channels from the plurality of groups of sub-channels; and
means for splitting the plurality of groups of sub-channels into a plurality of sub-bursts, wherein each sub-burst includes one of the map message fragments;
means for boosting each sub-burst of the plurality of sub-bursts; and
means for routing each boosted sub-burst to a different transmit antenna.

17. The apparatus according to claim 16, wherein the means for boosting comprises:
means for boosting each sub-burst of the plurality of sub-bursts by a factor which is an inverse of a ratio of group's aggregate bandwidth (BW) to the total available BW.

18. The apparatus according to claim 16, wherein means for routing comprises:
means for providing Cyclic Delay Diversity and routing each boosted sub-burst to a different transmit antenna.

19. The apparatus according to claim 16, wherein the map message comprises a portion of a transmission from a downlink PUSC (Partial Usage of Sub-channels) zone.

20. The apparatus according to claim 16, wherein the map message comprises a portion of a WiMAX preamble.

21. The apparatus according to claim 16, wherein the map message comprises a portion of an AMC (Adaptive Modulation and Coding) zone transmission.

* * * * *